Aug. 25, 1964     D. A. WALTHER     3,146,031
WHEELS FOR VEHICLES
Filed July 31, 1962     2 Sheets-Sheet 1
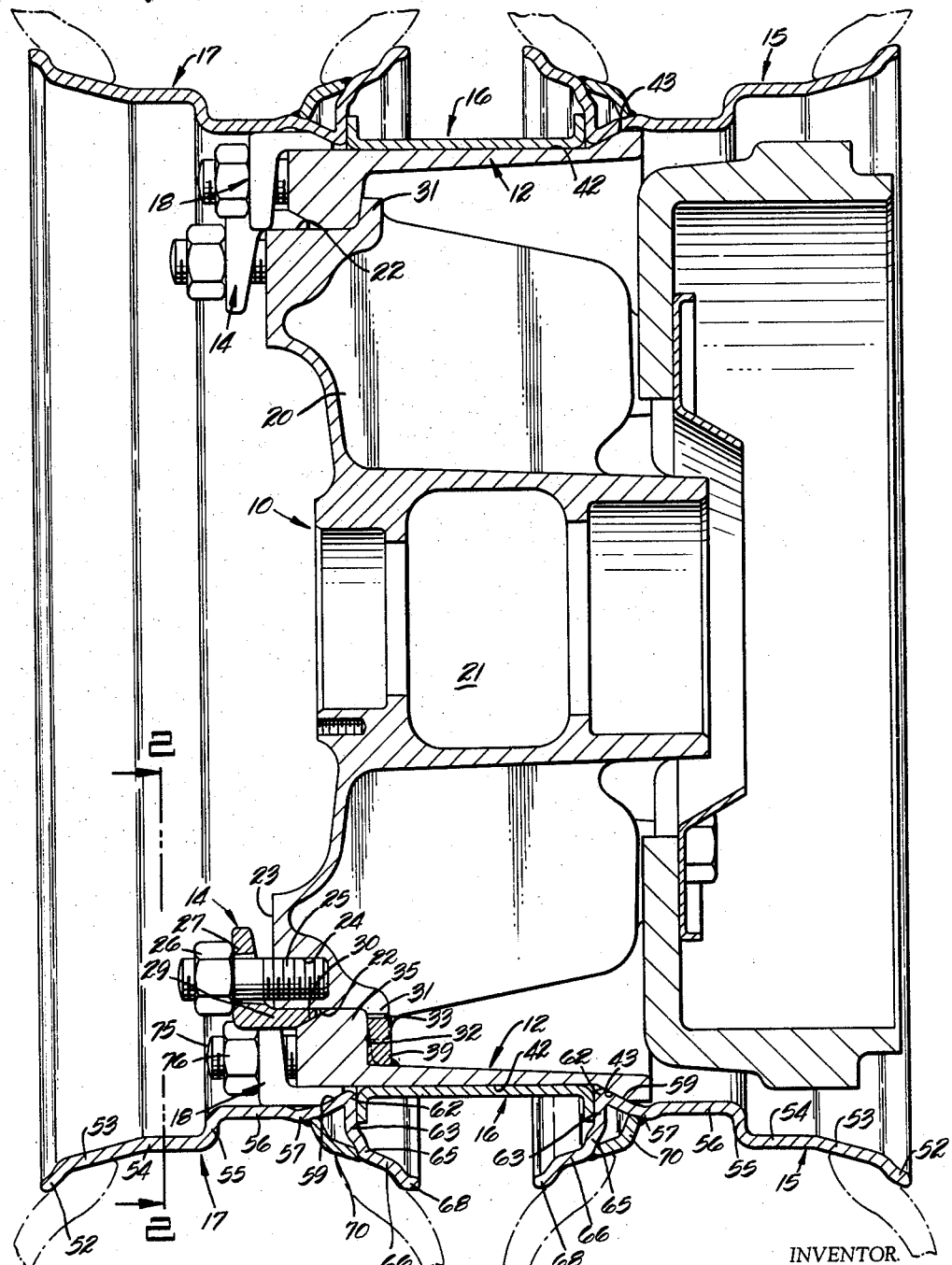
INVENTOR.
DANIEL A. WALTHER
BY
ATTORNEYS.

Aug. 25, 1964     D. A. WALTHER     3,146,031
WHEELS FOR VEHICLES
Filed July 31, 1962     2 Sheets-Sheet 2
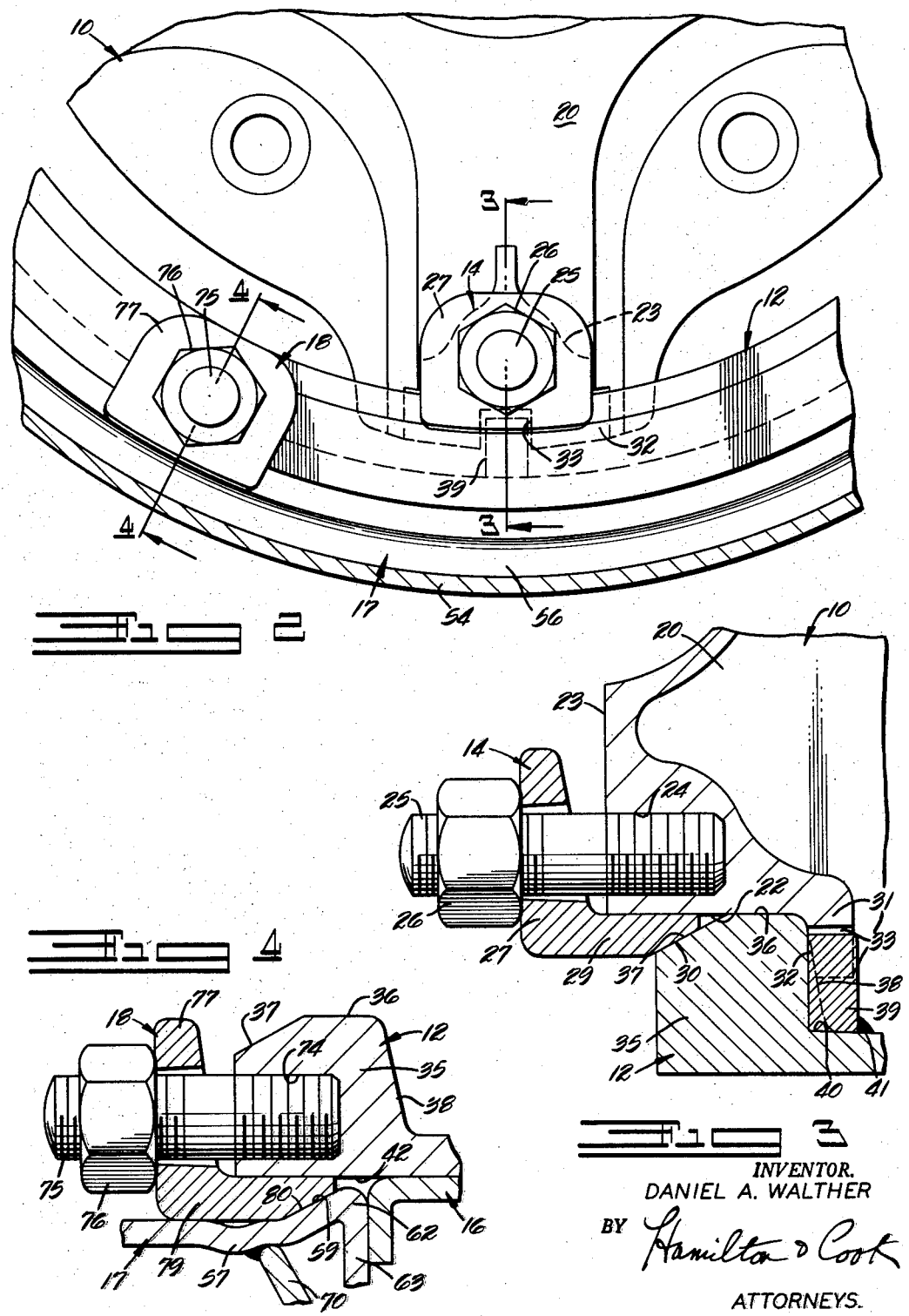
INVENTOR.
DANIEL A. WALTHER
BY
ATTORNEYS.

United States Patent Office 3,146,031
Patented Aug. 25, 1964

3,146,031
WHEELS FOR VEHICLES
Daniel A. Walther, Dayton, Ohio, assignor to The Dayton Steel Foundry Company, Dayton, Ohio, a corporation of Ohio
Filed July 31, 1962, Ser. No. 213,795
2 Claims. (Cl. 301—13)

The present invention relates to improvements in automotive or vehicle wheels. More particularly, the invention relates to vehicle wheels used for the mounting of one type of rim and tire which may be adapted or converted for the mounting of markedly different types of rims and tires.

Recently, the tire and the vehicle art has seen developments and innovations in the relatively "wide bead" or "wide base" truck or vehicle tire. The rim and wheel industry, of which applicant's assignee is a member, has contributed new concepts for the successful utilization and mounting of the wide bead tire. However, it may be several years before large quantities of wide bead tires are commercially available. Also, present information indicates that there are technical problems inherent in the use of wide bead tires which under certain conditions will require the use of standard tires mounted in the conventional or dual, inner rim-spacer band-outer rim, manner.

Therefore, it is an object of the present invention to provide concepts and mechanical elements whereby a vehicle wheel normally used for the mounting of a single rim and wide bead tire, may be converted for the mounting of dual rims and standard tires. Further, it is an object to accomplish this adaptation or conversion in a manner which is structurally sound and which provides a wheel mounting for dual rims in which all requiremenest such as concentricity, radial and lateral alignment, run out, force transmission and other technical considerations are fully met.

These and other objects of the invention, as well as the advantages thereof, will be apparent in view of the following detailed description and the attached drawings.

In the drawings:

FIG. 1 is a transverse section showing a wheel, adapter, clamp lugs and inner rim-spacer band-outer rim assembly, all according to the invention;

FIG. 2 is a fragmentary side view, taken substantially as indicated on line 2—2 of FIG. 1;

FIG. 3 is an enlarged section, taken substantially as indicated on line 3—3 of FIG. 2, showing details of the wheel felly surfaces, the annular adapter and the radially inner series of clamp lugs securing the adapter to the wheel;

FIG. 4 is another enlarged section, taken substantially as indicated on line 4—4 of FIG. 2, showing details of the adapter felly surface, the outer rim and spacer band, and the radially outer series of clamp lugs securing the rims and spacer band to the adapter.

In general, the invention relates to a wheel 10 having a felly surface of short axial width on the outward ends of the spoke members. Seated around the wheel felly surfaces is an annular adapter 12 having a felly surface of greater axial width. Clamp means or a first series of bolt supported fasteners or clamp lugs 14 secure the adapter 12 to the wheel 10. An inner rim 15-spacer band 16-outer rim 17 assembly is seated on the felly surface of the adapter 12. Additional clamp means or a second series of bolt supported clamp lugs 18 secure the rims 15 and 17 and spacer 16 on the adapter 12.

Referring to FIG. 1, a wheel 10 may have any desired number of spoke members 20, extending radially from a hub area 21 with brake drum terminating at their outer ends in an accurately machined load bearing or felly surface 22. The felly surface 22 is relatively narrow, having a short axial width, and is primarily designed and intended for the mounting of a relatively wide "drop center" or "flat base" rim such as used in conjunction with the recently developed "wide bead" or "wide base" truck or vehicle tires. The axially outer face of the terminal portion of each spoke member 20 is provided with a boss 23 having a threaded bore 24 for attachment of a clamp lug 14 as by a stud bolt 25 and nut 26.

Each clamp lug 14 has a radially oriented upright leg 27 with a slot for the supporting bolt 25. The horizontal leg or lateral portion 29 of a clamp 14 extends axially inward along the face of each wheel felly surface 22 and terminates in an axially inward radially inclined conical surface or face 30 for wedging engagement with the axially outer side of the base portion of an adapter 12. The clamp face 30 is bevelled at a standard angle (e.g.), approximately 28° as shown.

The axially inner end of each relatively narrow felly surface 22 is terminated abruptly by a radially outwardly directed flange portion 31. The axially outer face of each flange 31 is accurately machined to provide a stop or location surface 32 for the base portion of an adapter 12. The surface 32 is preferably oriented substantially perpendicularly to the rotational axis of the wheel 10, for example, at a vertical angle of 80–90°, substantially as shown.

Each spoke flange 31 also preferably has at least one driving notch 33 extending through the flange and surface 32 on the axial center line of each felly surface 22. The floor of each notch 33 is preferably parallel to the felly surface and the side walls are preferably perpendicular to the felly surface. However, the depth, axial position and exact shape of each notch 33 is not critical so long as the notches extend axially of the wheel flange 31 a distance sufficient to provide positive driving surfaces to engage a driving lug of an adapter 12, as described below. Further, each wheel flange may have more than one notch 33, in which event element 33 could be considered as a driving "lug," with relieved areas on either side.

The adapter 12 is an annular, circumferentially continuous member preferably fabricated from a metal casting machined to the configurations as described herein. As best shown in FIG. 3, the radially inward and axially outer portion of an adapter 12 is formed to provide a base or load bearing portion 35. The radially inner face of a base portion 35 is flat and horizontal to provide an annularly continuous axially extending surface 36 for seating on the machined felly surfaces 22 of a wheel 10.

The axially outer edge of an adapter base portion 35 is radially inclined at a standard angle (e.g. 28°) to provide an annularly continuous surface 37 for wedging engagement by the bevelled surface of each clamp lug 14.

The axially inner side of an adapter base portion 35 is radially oriented at a suitable angle to provide an annularly continuous surface 38 for mating engagement against the machined surface 32 of each spoke flange 31.

To provide a positive drive of the adapter 12 by the wheel 10, the axially inner side of an adapter base portion 35 preferably carries at least one driving lug 39 suitably spaced and shaped to selectively engage and positively interlock with one of the driving notches 33 of the wheel 10. The spacing of a lug 39 laterally from the base portion 35, and the length of a lug 39, is not critical so long as the lug extends axially of the adapter a distance sufficient to provide positive driving surfaces to engage the wheel notches 33. Further, if the wheel notches are so formed as to be considered driving "lugs," an element 39 could be considered as a driving "notch," with a relieved area in the middle.

Referring specifically to FIG. 3, as shown the lug 39 is a separately machined, preferably hardened, metal element inserted in a corresponding notch 40 machined in the axially inner side of the adapter base portion 35 and secured as a 41 by a weld. This technique of fabrication is well suited when the adapter 12 is fabricated from cast metal.

Referring to FIG. 1, the radially outer face of an adapter 12 is machined to provide a preferably circumferentially continuous outer load bearing surface 42 providing a felly for mounting of the dual rims 15 and 17. The felly surface 42 has an axial width substantially greater than the axial width of the wheel felly surfaces 22. The axially inner end of the felly surface 42 terminates in an axially inclined surface 43. The surface 43 has a standard (e.g. 28°) inclination for mounting of the rim gutter of an inner tire rim 15 to be mounted on the adapter.

The usual practice for a dual rim mounting is to use identical inner and outer rims. As shown, the identical rims 15 and 17 are of an improved "drop center" type. However, other drop center rims, as well as rims of the "flat base" type could be mounted with equal facility on the adapter 12.

Referring to FIG. 1, each rim 15 and 17 includes a low or side flange 52 to confine the edge of a tire bead. Axially inward of the low flange is an adjoining bead flange 53, having a standard taper (e.g. 15–20°) for seating the tire bead, and a substantially horizontal safety ledge 54. The axially inner edge of the ledge 54 terminates in the axially outer wall 55 of the drop center well 56. The radially inward end of wall 55 is connected to a substantially straight axially extending portion defining the radially inner side of the drop center well 56.

Adjacent the straight portion of the center well 56 is a shallow radially outward directed rib or bead 57. Extending radially inward from bead 57 is an axially inclined surface 59. The surface 59 has a standard (e.g. 28°) inclination to provide a rim gutter for mounting of the inner rim 15 on the adapter surface 43 and for wedging engagement of the outer rim 17 with a clamp 18, as described below.

The rim surface 59 terminates in an apex 62 having the smallest diameter of the several annular rim elements. A substantially straight rim positioning flange 63 extends radially outward from the apex 62. The radially outer end of flange 63 terminates in a short slightly rounded radially inward extending section 65. Extending radially outward of the section 65 is a bead flange 66, having a taper similar to bead flange 53, terminating in a low flange 68, similar to flange 52.

An annular ring reinforcing member 70 is seated in abutting contact against the bead 57 and the short section 65 to bridge the base of the inclined surface 59 and the positioning flange 63. The ring 70 is separately formed and is located in position prior to mounting of a tire to provide a surface defining the axially inner portion of a seat for a tire bead, in effect providing an extension of the bead flange 66. Because the ring 70 is a separately formed and fabricated member, required to be located in place only just before mounting of a tire, it is possible to form the acute angled apex portion 62 on a metal former or rolling die.

As shown, the spacer 16 is an annular U-shaped section. The width of the spacer ring is such as to fit between the flanges 63 of the rims 15 and 17 when the inner rim is seated on the adapter surface 43 and the outer rim is engaged by the clamp lugs 18.

As shown in FIG. 4, the axially outer face of the adapter 12 has a series of threaded bores 74 for attachment of the clamp lugs 18 as by a stud bolt 75 and nut 76. It is preferred that there be at least two clamp lugs 18 for each spoke member 20 of the wheel 10. As shown in FIG. 2, the clamp lugs 18 are positioned between the spoke members.

Each clamp lug 18 is similar to the clamp lugs 14 described above, having an upright leg 77 with a slot for the bolt 75. The horizontal or lateral leg 79 of a clamp 18 extends axially inward along the face of the adapter felly surface 42 and terminates in a face 80 for wedging engagement with the radially inner surface 59 of the outer rim 17. The clamp face 80 is bevelled at a standard angle (e.g.) approximately 28° as shown.

Summary

The concepts of the invention readily permit the conversion of a wheel 10 for use in the mounting of dual rims. The adapter 12 may be used, or removed, as required to mount dual rims on a wheel 10 having a felly surface (22) of axial width smaller than the width required for mounting of the dual rims.

It will be apparent that the above details are exemplary only. For example, reference has been made above to the mounting of different types of drop center rims, or of flat base rims, on the felly surface 42 of the adapter. Other modifications could include relieving the diameter of the central portion of felly surface 42 to form an area of lessened diameter so that the inner rim 15 may readily be slid back and seated on surface 43. Also, the spacer ring 16 could be of an expanding type construction. Or, the clamp lugs 14 and 18 could have a construction different in details from that shown. Therefore, the true spirit and scope of the invention should be determined solely by the scope of the claims.

What is claimed is:

1. The combination of:

a wheel having a plurality of spoke members, a felly surface on the radially outer end of each spoke member, and a flange portion (31) on the axially inner end of each felly surface, each flange portion having a surface (32) oriented substantially perpendicularly to the rotational axis of said wheel;

an annular adapter having a radially inner base portion (35), said base portion having a continuous axially extending surface (36) seating on said wheel felly surfaces and a continuous radially oriented surface (38) seating against the substantially perpendicular surfaces of said wheel flange portions, the radially outer portion of said adapter having a felly surface of axial width substantially greater than the axial width of the wheel felly surfaces;

a first series of clamp lugs supported by bolts (25) on the axially outer face of said spoke members, each said clamp lug having a lateral leg (29) wedged between a wheel felly surface and the axially outer side of the base portion of said adapter;

a dual, inner and outer rim assembly seated on the adapter felly surface, and a second series of clamp lugs supported by bolts (75) on the axially outer face of said adapter, each said clamp lug having a lateral leg (79) wedged between the adapter felly surface and a radially inner portion of said outer rim.

2. The combination of:

a wheel having a plurality of spoke members, a felly surface on the radially outer end of each spoke member, a flange portion on the axially inner end of each felly surface, and a notch (33) extending axially inward of each flange portion from said felly surface;

an annular adapter having a radially inner base portion seated on each felly surface and against said flange portion, the axially outer edge of said base portion having a radially inclined surface (37), the axially inner face of said base portion having a plurality of lugs (39) selectively interfitting with said wheel notches, and a radially outer portion defining a felly surface having axial width greater than the width of said wheel felly surface;

a first series of clamp lugs supported by bolts on the axially outer face of said spoke members, each said clamp lug having a lateral leg wedged between said wheel felly surfaces and the radially inclined surface on said adapter base portion;

an inner rim-spacer band-outer rim assembly seated on the adapter felly surface;

and a second series of clamp lugs supported by bolts on the axially outer face of said adapter, each said clamp lug having a lateral leg wedged between said adapter felly surface and a radially inner portion of said outer rim.

References Cited in the file of this patent

UNITED STATES PATENTS

| | | |
|---|---|---|
| 1,299,541 | Baker | Apr. 8, 1919 |
| 1,981,639 | Woodward | Nov. 20, 1934 |
| 1,985,054 | Nelson | Dec. 18, 1934 |
| 2,100,626 | Brink | Nov. 30, 1937 |
| 2,167,102 | Burger | July 25, 1939 |
| 2,194,206 | MacDonald | Mar. 19, 1946 |
| 2,992,045 | Martenet | July 11, 1961 |

FOREIGN PATENTS

| | | |
|---|---|---|
| 18,287 | Australia | May 29, 1935 |
| 404,486 | Italy | June 16, 1943 |
| 405,345 | Italy | Aug. 6, 1943 |
| 440,513 | Italy | Oct. 12, 1948 |

UNITED STATES PATENT OFFICE
CERTIFICATE OF CORRECTION

Patent No. 3,146,031                          August 25, 1964

Daniel A. Walther

It is hereby certified that error appears in the above numbered patent requiring correction and that the said Letters Patent should read as corrected below.

Column 3, line 9, for "a", first occurrence, read -- at --; column 6, line 8, for "Mar. 19, 1946" read -- Mar. 19, 1940 --.

Signed and sealed this 22nd day of December 1964.

(SEAL)
Attest:

ERNEST W. SWIDER
Attesting Officer

EDWARD J. BRENNER
Commissioner of Patents